US011800032B2

(12) United States Patent
Tokita (10) Patent No.: US 11,800,032 B2
(45) Date of Patent: Oct. 24, 2023

(54) APPARATUS, INFORMATION PROCESSING METHOD, AND STORAGE MEDIUM

(71) Applicant: CANON KABUSHIKI KAISHA, Tokyo (JP)

(72) Inventor: Ken Tokita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/951,982

(22) Filed: Sep. 23, 2022

(65) Prior Publication Data

US 2023/0108397 A1 Apr. 6, 2023

(30) Foreign Application Priority Data

Oct. 1, 2021 (JP) ................................. 2021-162743

(51) Int. Cl.
*H04N 1/387* (2006.01)
*H04N 1/00* (2006.01)

(52) U.S. Cl.
CPC ..... *H04N 1/00811* (2013.01); *H04N 1/00413* (2013.01); *H04N 1/00482* (2013.01); *H04N 1/00816* (2013.01); *H04N 1/3872* (2013.01)

(58) Field of Classification Search
None
See application file for complete search history.

(56) References Cited

U.S. PATENT DOCUMENTS

| 10,007,843 | B1* | 6/2018 | Letourneur | G06F 40/258 |
|---|---|---|---|---|
| 10,671,810 | B2* | 6/2020 | Koutrika | G06F 40/289 |
| 2006/0171002 | A1* | 8/2006 | Mori | H04N 1/3873 |
| | | | | 358/538 |
| 2013/0004073 | A1* | 1/2013 | Yamaji | H04N 1/00196 |
| | | | | 382/173 |
| 2014/0026104 | A1 | 1/2014 | Tokita | G06F 3/0481 |
| 2016/0321500 | A1 | 11/2016 | Tokita | G06K 9/00 |
| 2019/0102385 | A1 | 4/2019 | Tokita | G06K 9/00 |
| 2020/0344362 | A1* | 10/2020 | Miyamoto | G06V 30/414 |
| 2021/0227082 | A1* | 7/2021 | Mori | G06V 30/412 |
| 2021/0368050 | A1* | 11/2021 | Inoue | G06V 30/413 |

FOREIGN PATENT DOCUMENTS

| JP | 2002-024258 | | 1/2002 |
|---|---|---|---|
| JP | 2005208978 | A * | 8/2005 |

* cited by examiner

*Primary Examiner* — Dung D Tran
(74) *Attorney, Agent, or Firm* — Venable LLP (57) ABSTRACT

The present disclosure helps prevent scan image data obtained by bulk reading of a plurality of documents from being divided at a position unintended by a user. An apparatus according to the present disclosure can display, on a screen, a list of a plurality of page images obtained by reading a plurality of documents in bulk, display, on the screen where the list of the plurality of page images is displayed, one or more page images similar to a page image specified by a user as one or more sectioning position candidates in a manner discriminable from other page images of the plurality of page images, and correct the one or more sectioning position candidates based on a correction instruction from the user.

15 Claims, 8 Drawing Sheets

LIST OF UNDIVIDED DOCUMENTS

[ DIVIDE ]  [ EDIT ]  [ DELETE ]

| DOCUMENT COUNT | DESTINATION | PAGE COUNT | DATE |
|---|---|---|---|
| 5 | CLOUD STORAGE A | 42 | 2021/6/1 |
| 4 | CLOUD STORAGE A | 38 | 2021/6/1 |
| 10 | CLOUD STORAGE A | 55 | 2021/6/1 |
| 2 | CLOUD STORAGE A | 10 | 2021/6/1 |
| 3 | CLOUD STORAGE A | 30 | 2021/6/1 |

FIG.6B

SECTIONING POSITION SETTING SCREEN

[ OK ]  [ CANCEL ]

DOCUMENT COUNT : 5   TOTAL PAGE COUNT : 42

DOCUMENT1  PAGE COUNT:5

DOCUMENT2  PAGE COUNT:15

DOCUMENT3  PAGE COUNT:3

APPARATUS, INFORMATION PROCESSING METHOD, AND STORAGE MEDIUM

BACKGROUND

Field

The present disclosure relates to a technique for dividing scan image data.

Description of the Related Art

There are systems that digitize a document printed on one or more media such as paper (hereinafter referred to as a paper document) by optically reading the document and saves, in a storage, the document as scan image data including one or more page images ("optical reading" is hereinafter referred to as "scanning"). In a known method, a sectioning position is automatically identified in scan image data including a plurality of page images obtained by bulk scanning of a plurality of paper documents, and based on the sectioning position thus identified, the scan image data is divided into pieces of image data corresponding to the respective paper documents. Japanese Patent Laid-Open No. 2002-24258 discloses a method in which a page image corresponding to a sectioning position is identified in scan image data automatically based on a feature value of each page image, and in a case where the page image identified is not what is desired by a user, the page image is corrected based on a user operation. Specifically, in the method disclosed in Japanese Patent Laid-Open No. 2002-24258, in a case where a user designates a page image corresponding to a sectioning position desired by the user, a page image corresponding to a sectioning position is identified anew from all the page images based on the feature value of the user-specified page image.

In the method disclosed in Japanese Patent Laid-Open No. 2002-24258, scan image data is automatically divided based on a page image corresponding to a sectioning position identified automatically based on a page image specified by a user. The method disclosed in Japanese Patent Laid-Open No. 2002-24258 has a problem in that scan image data is automatically divided even in a case where a page image corresponding to a sectioning position automatically identified based on a page image specified by a user is not what is intended by the user. The present disclosure has been made to solve the above problem and has an object to provide an apparatus that can help prevent scan image data from being divided at a position unintended by a user.

SUMMARY

An apparatus includes: one or more hardware processors; and one or more memories storing one or more programs configured to be executed by the one or more hardware processors, the one or more programs including instructions for: displaying, on a screen, a list of a plurality of page images obtained by reading a plurality of documents in bulk; displaying, on the screen where the list of the plurality of page images is displayed, one or more page images similar to a page image specified by a user as one or more sectioning position candidates in a manner discriminable from other page images of the plurality of page images; and correcting the one or more sectioning position candidates based on a correction instruction from the user.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Embodiment 1

<System Configuration>

Figure 1:
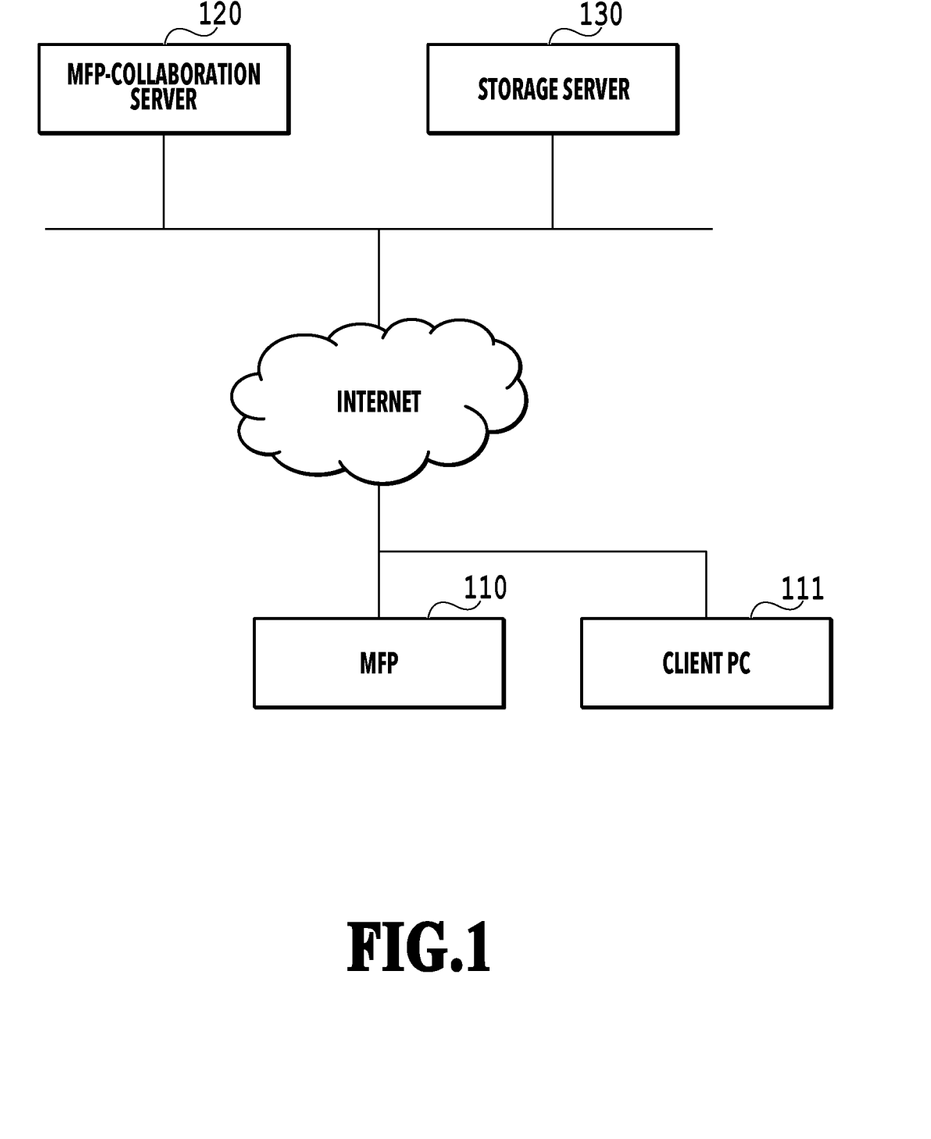
FIG. 1 is a block diagram showing an example of the overall configuration of an information processing system according to Embodiment 1.

FIG. 1 is a block diagram showing an example of the overall configuration of an information processing system according to Embodiment 1. The information processing system includes a multifunction peripheral (MFP) 110, a client PC 111, and server apparatuses 120 and 130 that provide a cloud service on the Internet. The MFP 110 and the client PC 111 are communicatively connected to various apparatuses that provide various services on the Internet via a local area network (LAN).

The MFP 110 is an example of an information processing apparatus having a scan function. The MFP 110 is a multi-function machine having a plurality of functions such as a print function and a BOX save function in addition to the scan function. The client PC 111 is an information processing apparatus, such as a desktop terminal or a mobile terminal, that can be provided with a cloud service via the Internet. The server apparatuses 120 and 130 are both an information processing apparatus that provides a cloud service. The server apparatus 120 of the present embodiment provides a cloud service such as performing image analysis on a scan image received from the MFP 110 and transferring a request from the MFP 110 to the server apparatus 130 that provides a different service. Hereinafter, the cloud service provided by the server apparatus 120 is referred to as an "MFP-collaboration service." The server apparatus 130 provides a cloud service such as saving file data sent via the Internet in a predetermined folder and providing a saved file in response to a request from a web browser on the client PC 111. Hereinafter, the cloud service provided by the server apparatus 130 is referred to as a "storage service." In the present embodiment, the server apparatus 120 that provides a MFP-collaboration service is referred to as an "MFP-collaboration server 120," and the server apparatus 130 that provides a storage service is referred to as a "storage server 130."

The information processing system of the present embodiment is configured with the MFP 110, the client PC 111, the MFP-collaboration server 120, and the storage server 130, but the present disclosure is not limited to this. For example, the MFP 110 may also play the role of the client PC 111 or the MFP-collaboration server 120. Also, the MFP-collaboration server 120 may be not on the Internet, but on the LAN. Also, the storage server 130 may be replaced by a mail server or the like and applied to a scene where a scan image is transmitted as an attachment to an email.

<Hardware Configuration of the MFP 110>

Figure 2:
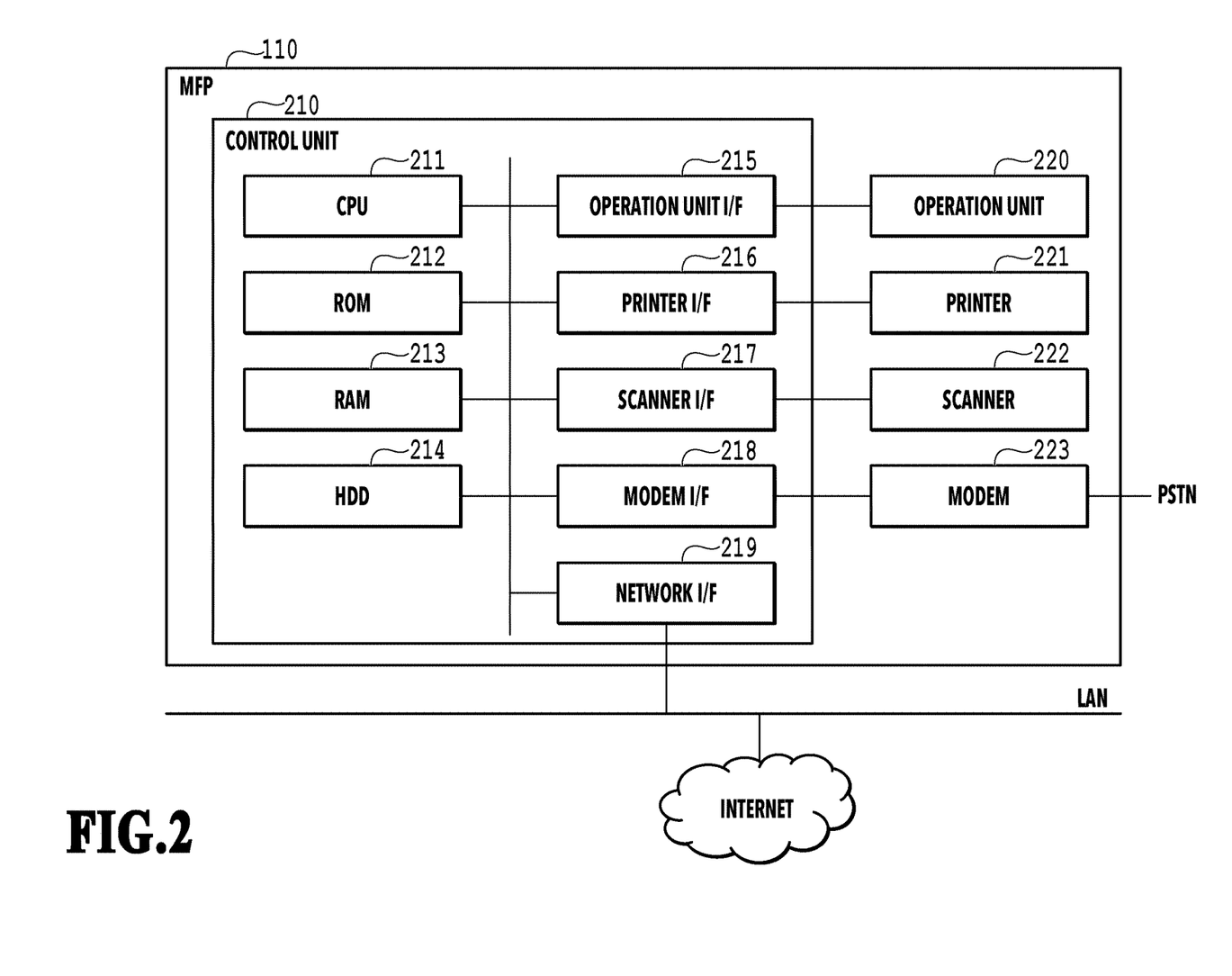
FIG. 2 is a block diagram showing an example hardware configuration of an MFP according to Embodiment 1.

FIG. 2 is a block diagram showing an example hardware configuration of the MFP 110 according to Embodiment 1. The MFP 110 includes a control unit 210, an operation unit 220, a printer unit 221, a scanner unit 222, and a modem 223. The control unit 210 is formed by units 211 to 219 to be described below and controls the overall operation of the MFP 110. A CPU 211 reads and executes control programs (programs corresponding to the various functions shown in the software configuration diagram to be referred to later) stored in a ROM 212. A RAM 213 is used as a temporary storage region, such as main memory and work memory, for the CPU 211. Although one CPU 211 executes the processes shown in the flowchart to be referred to later by using one memory (the RAM 213 or an HDD 214) in the present example, the present disclosure is not limited to this. For example, a plurality of CPUs or a plurality of RAMs or HDDs may cooperate to execute the processes.

The HDD 214 is a high-capacity storage unit that stores image data and various programs. An operation unit I/F 215 is an interface for connecting the operation unit 220 and the control unit 210 to each other. The operation unit 220 includes a touch panel, a keyboard, and/or the like and receives a user operation/input/instruction. Note that a touch operation performed on a touch panel includes an operation by a person's finger and an operation using a touch pen. A printer I/F 216 is an interface for connecting the printer unit 221 and the control unit 210 to each other. Image data for printing is transferred from the control unit 210 to the printer unit 221 via the printer I/F 216 and is printed on a print medium.

A scanner I/F 217 is an interface for connecting the scanner unit 222 and the control unit 210 to each other. The scanner unit 222 reads an original set on a scanner bed or an automatic document feeder (ADF) (neither is shown) to generate scan image data and inputs the scan image data into the control unit 210 via the scanner I/F 217. The scan image data generated by the scanner unit 222 can be printed by the printer unit 221 (copy output), saved in the HDD 214, or transmitted as a file or emailed to an external apparatus such as the MFP-collaboration server 120 via the LAN. A modem I/F 218 is an interface for connecting the modem 223 and the control unit 210 to each other. The modem 223 performs facsimile communications of image data with a facsimile machine (not shown) on a public switched telephone network (PSTN). A network I/F 219 is an interface for connecting the control unit 210 (the MFP 110) to the LAN. Using the network I/F 219, the MFP 110 transmits image data and information to the services on the Internet and receives various kinds of information. The above-described hardware configuration of the MFP 110 is merely an example. The MFP 110 may include other configurations or may be without some of the configurations, as needed.

<Hardware Configuration of the Client PC 111 and the Server Apparatuses 120, 130>

Figure 3:
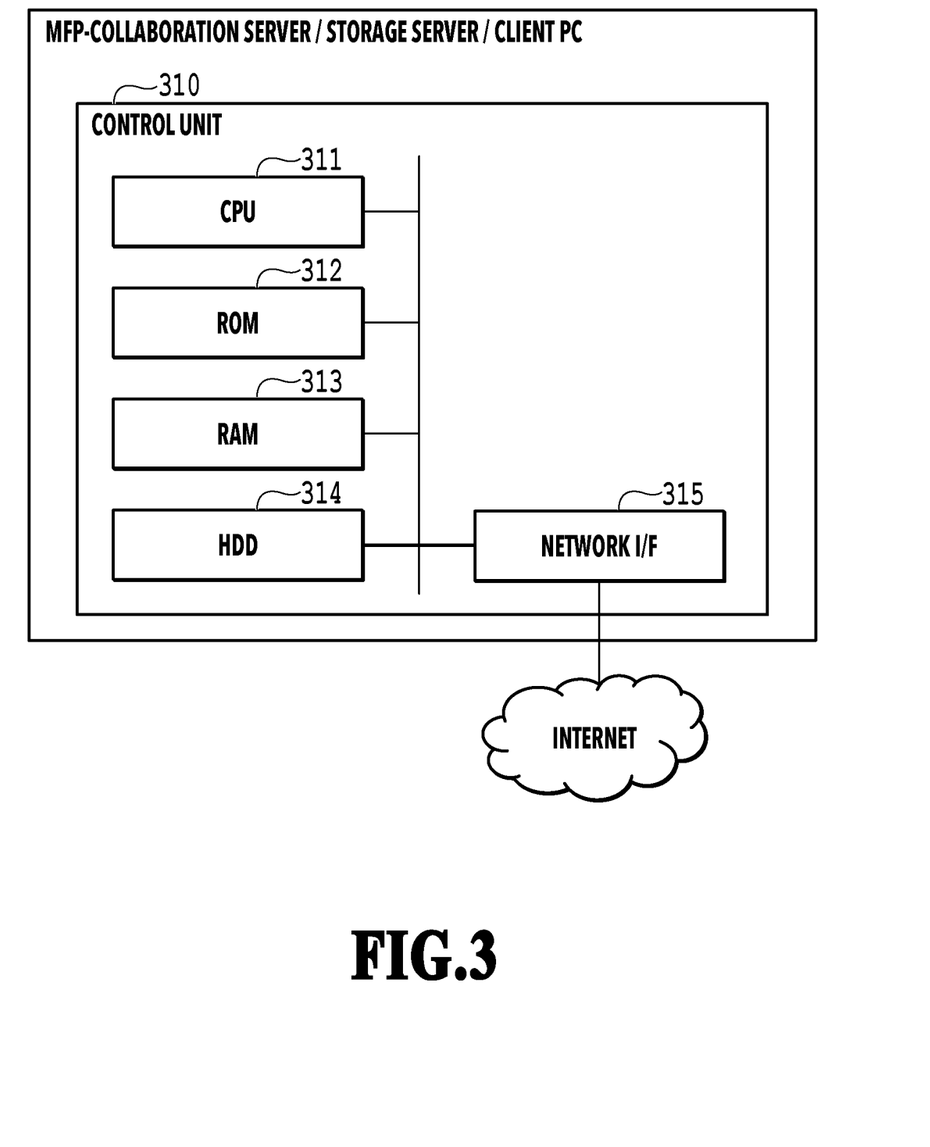
FIG. 3 is a block diagram showing example hardware configurations of a client PC, an MFP-collaboration server, and a storage server according to Embodiment 1.

FIG. 3 is a block diagram showing an example hardware configuration of the client PC 111, the MFP-collaboration server 120, and the storage server 130 according to Embodiment 1. The client PC 111, the MFP-collaboration server 120, and the storage server 130 are each configured by a CPU 311, a ROM 312, a RAM 313, an HDD 314, and a network I/F 315. The CPU 311 controls the overall operation by reading control programs stored in the ROM 312 and executing various kinds of processing. The RAM 313 is used as a temporary storage region, such as main memory and work memory, for the CPU 311. The HDD 314 is a high-capacity storage unit that stores image data and various programs. The network I/F 315 is an interface for connecting the client PC 111, the MFP-collaboration server 120, and the storage server 130 to the Internet. Via the network I/F 315, the MFP-collaboration server 120 and the storage server 130 receive requests for various kinds of processing from other apparatuses (such as the MFP 110 and the client PC 111) and return processing results for the requests.

<Software Configuration of the Information Processing System>

Figure 4:
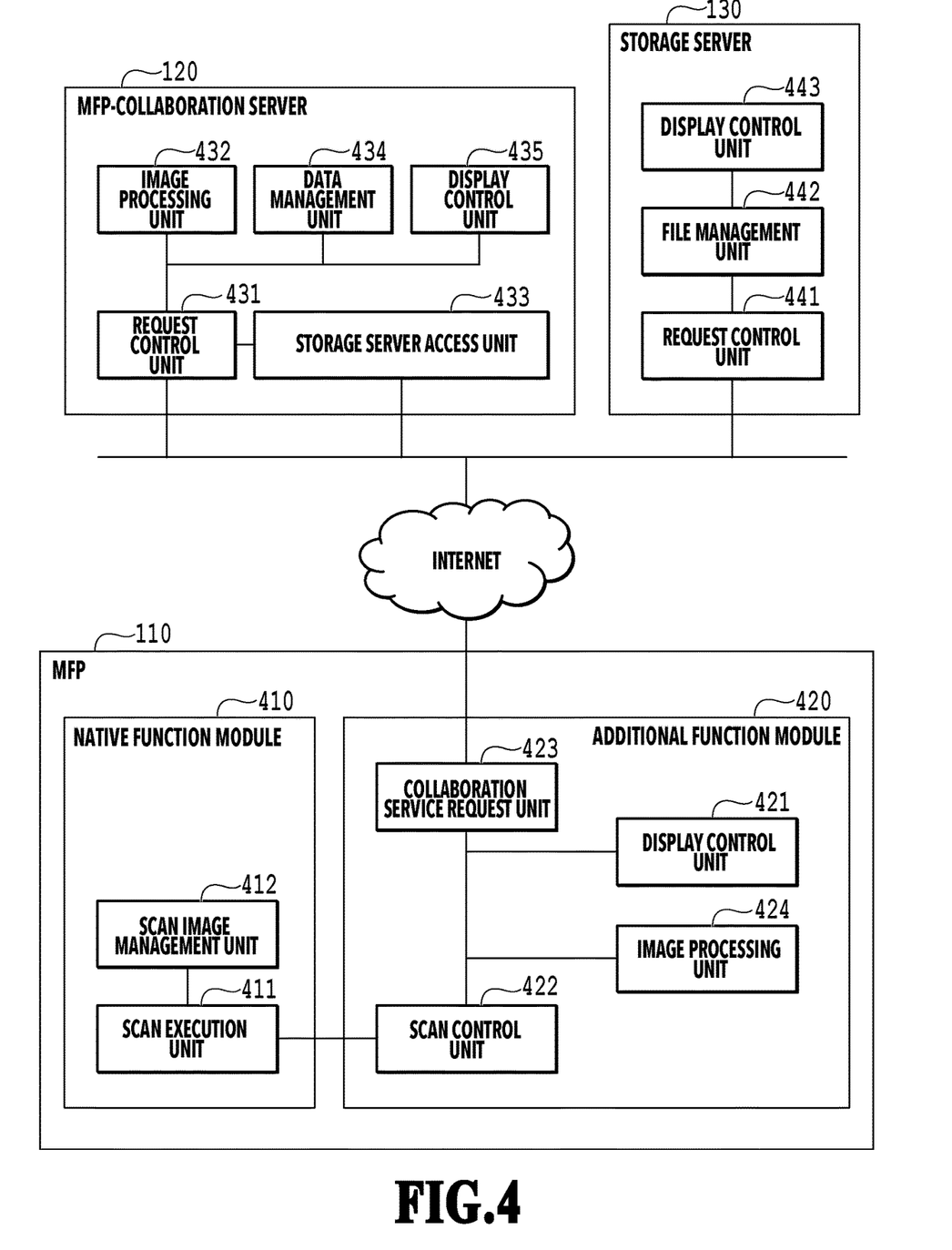
FIG. 4 is a block diagram showing an example software configuration of the information processing system according to Embodiment 1.

FIG. 4 is a block diagram showing an example software configuration of the information processing system according to Embodiment 1. The software configurations corresponding to the roles of the MFP 110, the MFP-collaboration server 120, and the storage server 130 are described below in order. Among various functions that each apparatus has, the following description focuses on functions related to a process in which scan images obtained by the MFP 110 by scanning a document printed on one or more media such as paper (hereinafter referred to as a "paper document") are converted into a file and saved in the storage server 130 via the MFP-collaboration server 120.

<<Software Configuration of the MFP>>

Function modules of the MFP 110 are broadly divided into two groups: a native function module 410 and an additional function module 420. The native function module 410 is an application standardly included in the MFP 110, whereas the additional function module 420 is an application additionally installed in the MFP 110. The additional function module 420 is an application based on Java (registered trademark), and a function can be easily added to the MFP 110. Note that the MFP 110 may have other additional applications that are not shown installed therein.

The native function module 410 has a scan execution unit 411 and a scan image management unit 412. The additional function module 420 has a display control unit 421, a scan control unit 422, a collaboration service request unit 423, and an image processing unit 424. The display control unit 421 displays a user interface (UI) screen on a touch panel of the operation unit 220 in order to receive various user operations. Various user operations include, for example, inputting login authentication information for accessing the MFP-collaboration server 120, making scan settings, setting rules related to folder sorting and file naming, instructing to start scanning, and instructing to save a file.

In response to a user operation (e.g., pressing a "start scan" button) performed on the UI screen, the scan control unit 422 gives the scan execution unit 411 an instruction to execute scan processing, along with information on scan settings. In response to the instruction to execute scan processing from the scan control unit 422, the scan execution unit 411 causes, via the scanner I/F 217, a scanner unit 222 to execute an operation of reading a paper document, thereby generating scan image data including one or more page images. The generated scan image data is saved in the HDD 214 by the scan image management unit 412. In this event, the scan control unit 422 is notified of information on a scan image identifier uniquely identifying the saved scan image data. The scan image identifier is numbers, symbols, alphabet letters, or the like for uniquely identifying an image scanned by the MFP 110. For example, the scan control unit 422 obtains scan image data to be converted into a file from the scan image management unit 412 using the scan image identifier. Then, the scan control unit 422 instructs the collaboration service request unit 423 to request the MFP-collaboration server 120 to perform processing necessary for the file conversion.

The collaboration service request unit 423 requests the MFP-collaboration server 120 to perform various kinds of processing and receives responses for them. Examples of the various kinds of processing include login authentication, analysis of scan images, and transmission of scan image data. A communications protocol such as REST or SOAP is used for communications with the MFP-collaboration server 120. The image processing unit 424 performs predetermined image processing on scan image data and thereby generates an image to use for the UI screen displayed by the display control unit 421.

<<Software Configuration of the Server Apparatuses 120, 130>>

First, the software configuration of the MFP-collaboration server 120 is described. The MFP-collaboration server 120 has a request control unit 431, an image processing unit 432, a storage server access unit 433, a data management unit 434, and a display control unit 435. The request control unit 431 is in standby, ready to receive requests from external apparatuses, and according to the content of a request received, instructs the image processing unit 432, the storage server access unit 433, and the data management unit 434 to execute predetermined processing. The image processing unit 432 performs, on each page image included in scan image data sent from the MFP 110, image analysis processing such as text region detection processing, text recognition processing, and page image similarity determination processing, as well as image modification processing such as rotation and tilt correction. The storage server access unit 433 issues processing requests to the storage server 130. A cloud service publicly releases various interfaces for saving a file in the storage server or obtaining a saved file using a protocol such as REST or SOAP.

The storage server access unit 433 uses a publicly-released interface to issue a request to the storage server 130. The data management unit 434 holds and manages user information, various kinds of settings data, and the like to be managed by the MFP-collaboration server 120. In response to a request from a web browser operating on the client PC 111 or the MFP 110 connected via the Internet, the display control unit 435 returns screen configuration information (such as HTML or CSS) necessary for displaying a screen. On a screen displayed on the web browser, a user can check registered user information or change scan settings or rules set as to folder sorting and file naming.

Next, the software configuration of the storage server 130 is described. The storage server 130 has a request control unit 441, a file management unit 442, and a display control unit 443. The request control unit 441 is in standby, ready to receive requests from external apparatuses. and in the present embodiment, instructs the file management unit 442 to save a received file or read a saved file in response to a request from the MFP-collaboration server 120. Then, the request control unit 441 returns a response for the request to the MFP-collaboration server 120. In response to a request from a web browser operating on the client PC 111 or the MFP 110 connected via the Internet, the display control unit 443 returns screen configuration information (such as HTML or CSS) necessary for displaying a screen. On a screen displayed on the web browser, a user can check or obtain a saved file. Note that the client PC 111 also includes functional modules that are the same as those in the additional function module 420 described above, although FIG. 4 omits them.

<Overall Flow of Processing by the Information Processing System>

Figures 5, 5A:
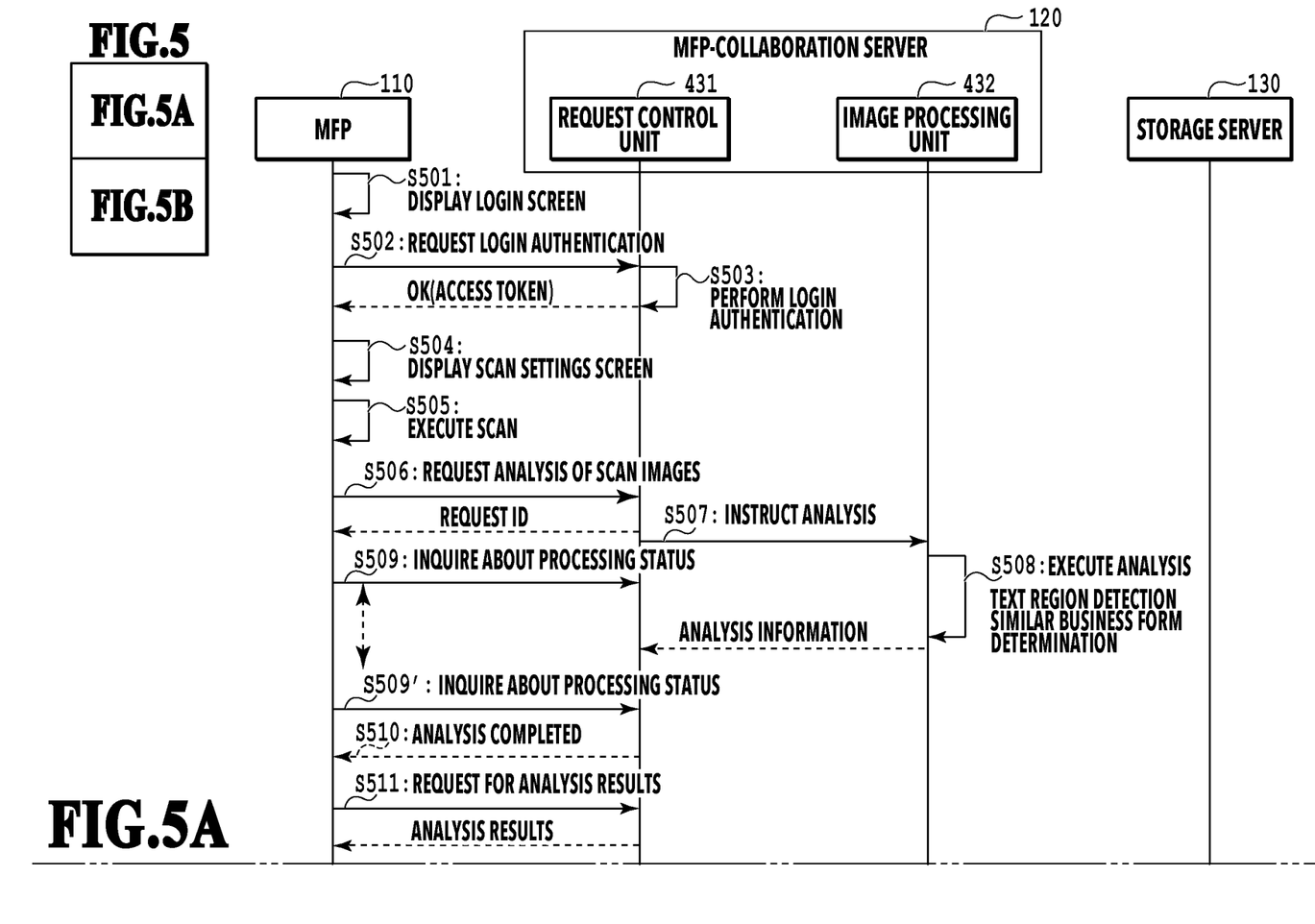
FIG. 5 is a diagram showing a relationship between FIGS. 5A and 5B.
FIGS. 5A and 5B are sequence diagrams showing an example flow of processing performed between the apparatuses in the information processing system according to Embodiment 1.
Figure 5B:
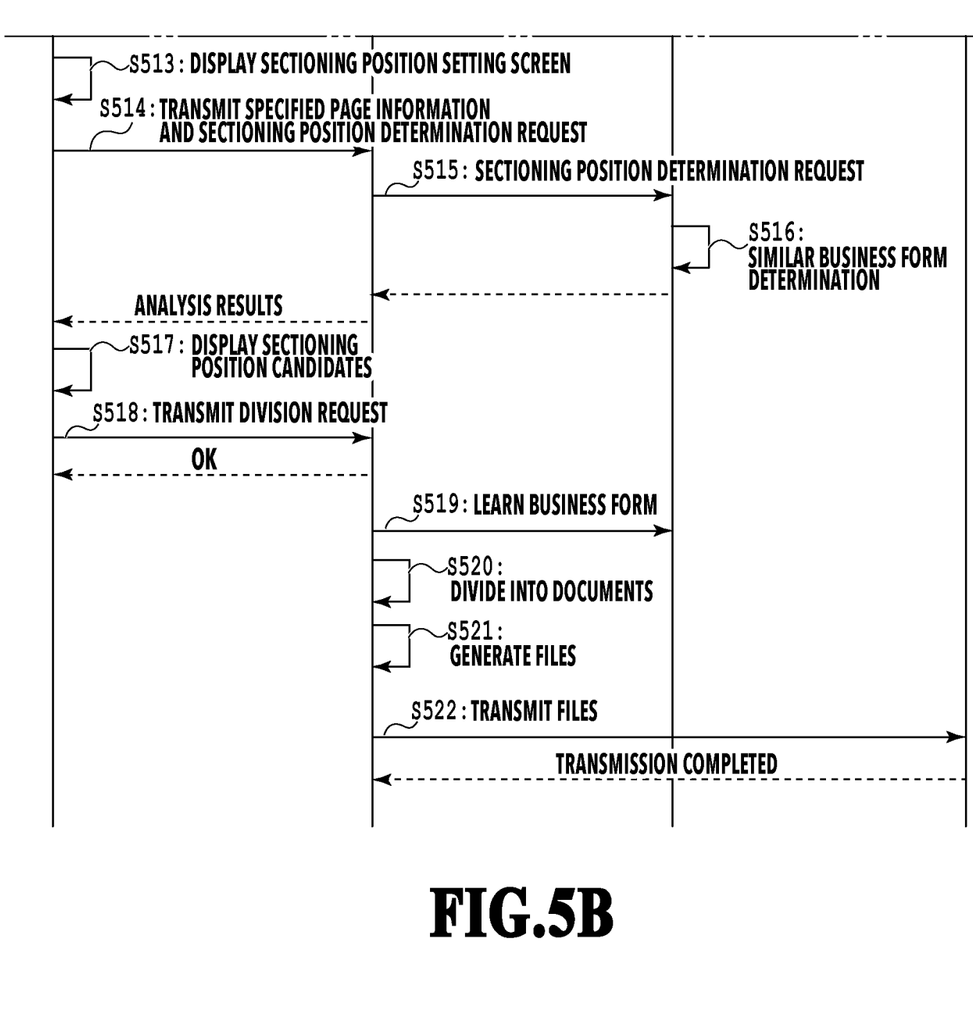

FIGS. 5A and 5B are sequence diagrams showing an example of the flow of processing performed between the apparatuses in the information processing system according to Embodiment 1. Specifically, the sequence diagram shown in FIGS. 5A and 5B show the flow of processing performed between apparatuses, in which scan images obtained by the MFP 110 according to Embodiment 1 by bulk scanning of a plurality of paper documents are divided into images corresponding to the paper documents, converted into files, and saved in the storage server 130. Here, transmission and reception of data between apparatuses are mainly described. Note that the MFP 110 is depicted as communicating with the MFP-collaboration server 120 in FIGS. 5A and 5B, but the present disclosure is not limited to this. For example, processing such as obtaining analysis results to be described later and displaying a screen and instructing learning exemplified in FIGS. 6A and 6B or FIGS. 7A and 7B to be referred to later may be executed not by the MFP 110, but by the client PC 111. In such a configuration, the client PC 111 communicates with the MFP-collaboration server 120. In the following description, the letter "S" denotes Step.

The MFP 110 displays, on the operation unit 220, a UI screen for entering login authentication information for accessing the MFP-collaboration server 120 (hereinafter referred to as a "login screen") (S501). After a user enters a user ID and a password and performs a login operation, the MFP 110 transmits a login authentication request to the MFP-collaboration server 120 (S502).

The MFP-collaboration server 120 that has received the login authentication request performs authentication processing using the user ID and the password included in the request (S503). If it is confirmed as a result of the authentication processing that the user is authentic, the MFP-collaboration server 120 returns an access token to the MFP 110. From then on, in the events where the MFP 110 issues various requests to the MFP-collaboration server 120, this access token is sent together so that the logged-in user is identified. In the present embodiment, in a case where a user is successfully logged in to the MFP-collaboration server 120, the user is also successfully logged in to the storage server 130 at the same time. To this end, via, e.g., a web browser on a PC (not shown) on the Internet, the user links the user ID for using the MFP-collaboration service to the user ID for using the storage service in advance. Then, in a case where a login to the MFP-collaboration server 120 is successfully authenticated, a login to the storage server 130 is successfully authenticated at the same time, which can save a user from having to perform an operation for logging in to the storage server 130. Also, this allows the MFP-collaboration server 120 to handle a storage-service-related request from a user that has logged into the MFP-collaboration server 120 (hereinafter referred to as a "logged-in user"). Note that as a method for the login authentication, a generally publicly-known approach (such as Basic authentication, Digest authentication, or OAuth authentication) may be used.

Once the user is successfully logged in, a UI screen for scan settings (hereinafter referred to as a "scan settings screen") is displayed on the operation unit 220 of the MFP 110 (S504). The scan settings screen has a "start scan" button, which is for instructing to start scan processing for paper documents (assumed in the present embodiment to be business forms such as quotations or invoices) set on the scanner bed. Once the logged-in user sets a plurality of paper documents to be scanned on the scanner bed of the MFP 110 and presses the "start scan" button, the plurality of paper documents to be scanned are scanned in bulk (S505). As a result, the plurality of paper documents are digitized and generated as scan image data including a plurality of page images. After the scans are complete, the MFP 110 transmits the scan image data obtained by the scans to the MFP-collaboration server 120 along with a scan image analysis request (S506).

In the MFP-collaboration server 120 that has received the scan image analysis request, the request control unit 431 instructs the image processing unit 432 to execute image analysis processing (S507). In this event, the request control unit 431 returns, to the MFP 110, a request ID with which the received analysis request is uniquely identifiable. Meanwhile, the image processing unit 432 that has been instructed to execute analysis processing executes image analysis processing on the scan images. In this image analysis processing, the image processing unit 432 first performs processing for detecting a text region in each page image (hereinafter referred to as "text region detection processing") (S508). For the text region detection processing, a well-known text region detection method is used, such as for example a method of extracting a rectangular region presumed to be text from an image binarized based on a certain threshold.

Next, the image processing unit 432 determines whether the business form of the current scan target meets a pre-defined condition. Specifically, the image processing unit 432 performs processing for determining whether the business form of the current scan target is similar to any of the business forms scanned in the past (hereinafter referred to as "similar business form determination processing"). In the similar business form determination processing, location information is used which indicates where in a page image each text region existing in the page image is located. Specifically, location information on each page image of the current scan images is compared with location information on each page image of the past scan images to determine whether their locations of the text regions are similar to each other. This is because in a case where business forms are similar in their locations of text regions, the business forms have presumably been created using the same format. The location information on each page image of the past scan images used in this similar business form determination is added and accumulated by "business form learning processing" to be described later. Results of the image analysis processing are passed to the request control unit 431. Note that the similar business form determination processing is not limited to the above-described text region location comparison processing, and other determination methods may be used.

While the above-described image analysis processing is performed, the MFP 110 inquires at the MFP-collaboration server 120 about processing status periodically (e.g., every several hundreds of milliseconds to several milliseconds) using the above-described request ID (S509 to S509'). This inquiry is repeated until the MFP 110 can obtain, from the MFP-collaboration server 120, a response indicating that the image analysis processing is complete (S510). In response to the inquiry about the processing status, the MFP-collaboration server 120 checks the progress of the image analysis processing corresponding to the request ID and returns a response. In this response, "status" has a character string indicating the current processing status, or more specifically, "processing" in a case where the processing is currently being performed by the MFP-collaboration server 120 and "completed" in a case where the processing has been completed. Note that "status" may have a character string indicating a different status such as "failed" in a case where the processing failed. A response returned upon completion of the processing includes, in addition to the status information, information related to results of scan image analysis and the like.

After receiving a processing completion response, the MFP 110 requests the MFP-collaboration server 120 for results of the image analysis processing using an URL indicating the storage location of the image analysis results, the URL being included in the response (S511). In response to the request, the request control unit 431 of the MFP-collaboration server 120 returns information indicating the results of the image analysis processing (hereinafter referred to as "result information"). Then, the MFP 110 uses the result information obtained and displays a sectioning position setting screen for setting sectioning positions in the scan image data (S513). Displayed on the sectioning position setting screen is, for example, a list of a plurality of page images included in the scan image data obtained by the scanning by the MFP 110. The sectioning position setting screen may be such that, based on the result information on the image analysis processing, a page image determined as being similar to a pre-registered image by the similar business form determination processing is displayed as an initial sectioning position in a manner discriminable from other page images. Details of the sectioning position setting screen will be described later with reference to FIGS. 6A and 6B.

Through a user operation, the user selects and specifies a page image that the user wants as a sectioning position from the list of page images displayed on the sectioning position setting screen. Once a page image is specified on the sectioning position setting screen, the MFP 110 transmits a sectioning position determination request to the MFP-collaboration server 120 along with information indicating the page image specified (hereinafter referred to as "specified page information") (S514). The request control unit 431 of the MFP-collaboration server 120 that has received the sectioning position determination request asks the image processing unit 432 to perform sectioning position determination (S515). The image processing unit 432 performs similar business form determination processing in order to detect one or more page images similar to the page image indicated by the specified page information (hereinafter referred to as "similar page images") (S516).

Information indicating the similar page images detected by the image processing unit 432 as a result of the similar business form determination processing (hereinafter referred to as "similar business form page information") is sent to the MFP 110 via the request control unit 431. Upon receipt of the similar business form page information, the MFP 110 displays sectioning position candidates on the sectioning position setting screen (S517). Specifically, for example, the similar page images indicated by the similar business form page information are displayed on the sectioning position setting screen as sectioning position candidates in a manner discriminable from the other page images. For example, in a case where the sectioning position candidates on the sectioning position setting screen displayed in S517 include a page image undesired as a sectioning position, the user can remove the page image undesired as a sectioning position from the sectioning position candidates. Also, in a case where the sectioning position candidates being displayed do not include a page image that the user wants as a sectioning position, the user may repeat the operation in which the user specifies a page image as a sectioning position. Specifically, in this case, the information processing system repeats the processing from S514 to S517. The processing from the S514 to S517, or more specifically from the specification of a sectioning position to the display of the sectioning position candidates, will be described later with reference to FIGS. 7A and 7B.

Next, upon receipt of a user operation instructing division execution, the MFP 110 transmits information indicating the sectioning position candidates (hereinafter referred to as "sectioning position information") to the MFP-collaboration server 120 along with a division request (S518). Upon receipt of the division request, the MFP-collaboration server 120 performs processing for learning a business form which has not been learned yet among the page images (business forms) indicated by the sectioning position information received (hereinafter referred to as "business form learning processing") (S519). In a case where scan image data including a certain page image having a business form similar to the business form on the page image indicated by the sectioning position information is obtained in a later scan, the above learning allows the certain page image to be displayed on an initial sectioning position setting screen as an initial sectioning position. Settings for whether to perform business form learning processing on a business form indicated by sectioning position information will be described later with reference to FIGS. 7A and 7B.

Next, using the sectioning position information received, the MFP-collaboration server 120 performs scan image dividing processing to divide the scan image data obtained by the scanning by the MFP 110 into a plurality of pieces of image data corresponding to the respective paper documents (S520). Next, the MFP-collaboration server 120 obtains information on a file format used for transmission to the storage server 130 from the scan settings information registered at the MFP-collaboration server 120. Further, the MFP-collaboration server 120 converts the pieces of image data obtained by the division into the file format to generate files corresponding to the respective paper documents (S521). Lastly, the MFP-collaboration server 120 transmits the generated files to the storage server 130 and has the storage server 130 store the files (S522).

Figure 6A:
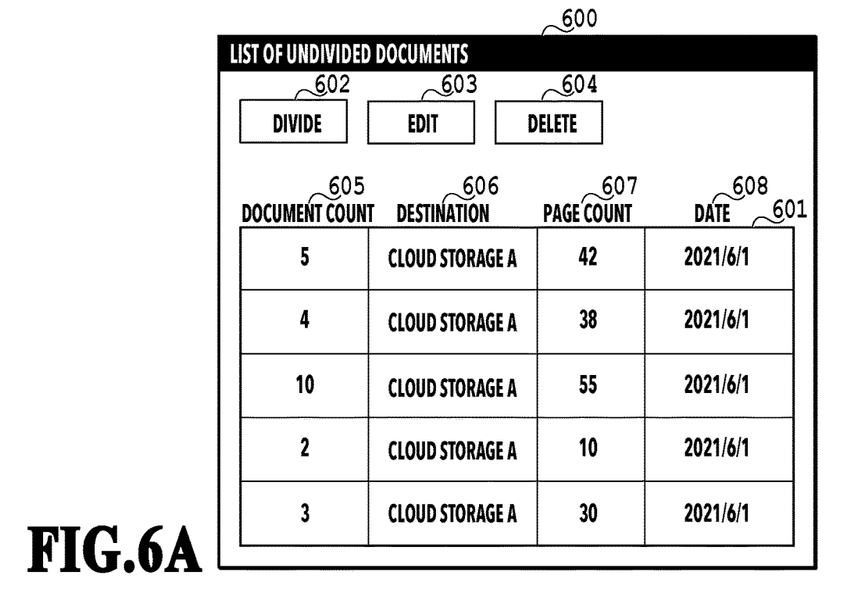
FIGS. 6A and 6B are diagrams illustrating an example screen displayed by the MFP or the client PC according to Embodiment 1.
Figure 6B:
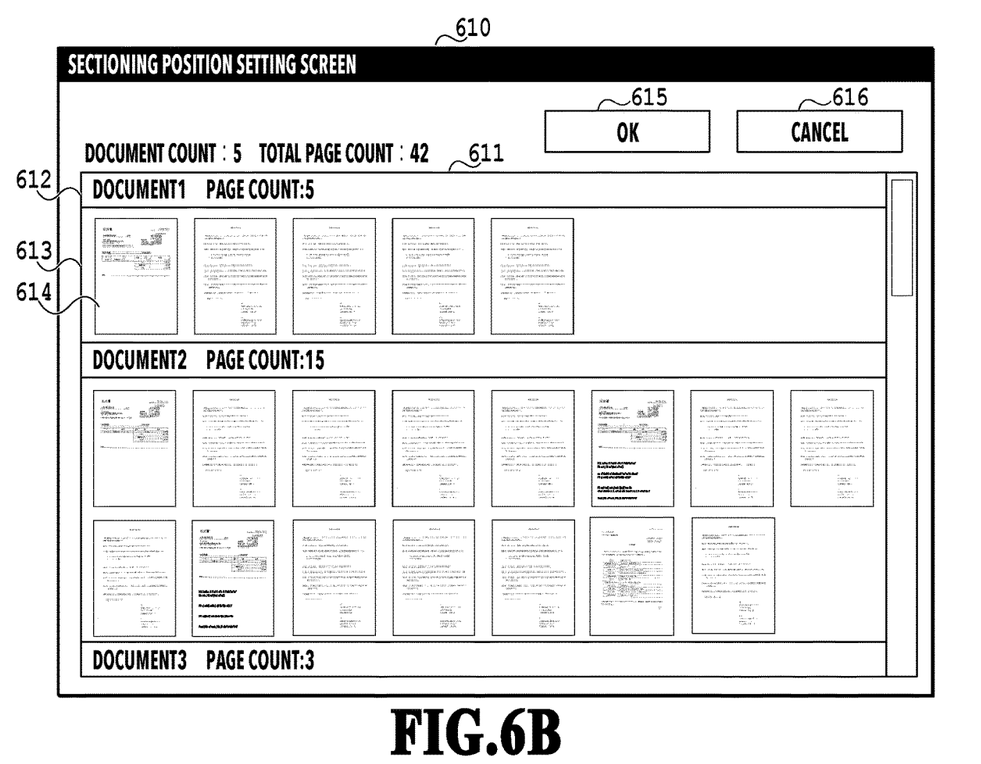

FIGS. 6A and 6B are diagrams illustrating an example of a screen displayed by the MFP 110 or the client PC 111 according to Embodiment 1. It is assumed here that a plurality of documents each formed by a plurality of pages are scanned in bulk by a single round of scans. It is possible to divide scan image data into documents after every scan processing of scanning a plurality of documents, but in the present example, the division is performed as follows. First, scan image data obtained by scanning of a plurality of documents in bulk is temporarily held. Also, after the bulk scan processing is performed multiple times, scan image data selected by a user from pieces of scan image data temporarily held is presented so that it can be divided into documents. FIG. 6A is a diagram showing an example of a screen (an undivided document list screen 600) showing a list of pieces of scan image data having yet to undergo the scan image dividing processing (sectioning position checking processing by a user) among a plurality of pieces of scan image data obtained by a plurality of rounds of scan processing (scan image data having yet to undergo the scan image dividing processing is hereinafter referred to as "undivided scan image data"). After completion of the scanning by the MFP 110 and the image analysis processing by the MFP-collaboration server 120, a user can see, on the undivided document list screen 600, a list of pieces of scan image data which have yet to be transmitted to the storage server 130 as files corresponding to the respective paper documents. The undivided document list screen 600 has a list 601 of undivided documents, a DIVIDE button 602, an EDIT button 603, and a DELETE button 604.

The list 601 of undivided documents presents a list of pieces of undivided scan image data which have been obtained by the scanning by the MFP 110 and subjected to the image analysis processing by the MFP-collaboration server 120. The pieces of undivided scan image data displayed in the respective rows of the list 601 of undivided documents each include a plurality of page images obtained by bulk scanning of a plurality of paper documents performed in response to an instruction to start a single round of scanning processing. Information displayed in the list 601 of undivided documents indicates, as exemplified in FIG. 6A, a document count 605, a destination 606, a page count 607, and a date 608, corresponding to each piece of undivided scan image data. The document count 605 indicates the number of documents into which undivided scan image data is divided at initial sectioning positions. The value in the document count 605 is updated in a case where a sectioning position is changed by a user operation on the sectioning position setting screen. The destination 606 is information on a server name or the like indicating the storage server 130 to which the files corresponding to the paper documents are transmitted after the scan image dividing processing. The page count 607 is the number of page images (hereinafter referred to as a "total page count") included in scan data obtained by scanning performed in response to an instruction to start a single round of scanning processing. The date 608 is information indicating, e.g., the date of the scans.

The DIVIDE button 602 is a button for instructing to divide undivided scan image data into pieces of image data corresponding to paper documents at sectioning positions that are being set, generate files corresponding to the pieces of image data, and transmit the files to the storage server 130. Once the DIVIDE button 602 is pressed after any undivided scan image data is selected from the list 601 of undivided documents by a user operation, the MFP 110 transmits sectioning position information corresponding to the selected undivided scan image data to the MFP-collaboration server 120 (S518). Upon receipt of the sectioning position information, the MFP-collaboration server 120 executes the processing from the scan image dividing processing to the file transmission processing (S519 to S521). Note that after the file transmission processing is completed successfully, the undivided scan image data selected by the user operation is deleted from the list 601 of undivided documents.

The EDIT button 603 is a button for displaying a sectioning position setting screen 610 to be described later. First, any undivided scan image data is selected from the list 601 of undivided documents by a user operation. Next, once the EDIT button 603 is pressed, the MFP 110 displays the sectioning position setting screen 610 for setting and changing sectioning positions for the undivided scan image data (S513). The DELETE button 604 is a button for deleting undivided scan image data. In a case where the DELETE button 604 is pressed after any undivided scan image data is selected from the list 601 of undivided documents by a user operation, the MFP 110 deletes the selected undivided scan image data.

FIG. 6B is a diagram showing an example of the sectioning position setting screen 610, and is an example of a screen shown after a user selects the first row of the list 601 of undivided documents in FIG. 6A and presses the EDIT button 603. The sectioning position setting screen 610 has a sectioning position setting region 611 and a sectioning position determination button 615. The sectioning position setting region 611 is a region for a user to set sectioning positions in scan image data. The undivided scan image data on the first row of the list 601 of undivided documents in FIG. 6A is initially divided into five documents based on initial sectioning positions obtained by the analysis processing in S508 and is therefore initially displayed in the sectioning position setting region 611 as initially-divided groups of documents. In the sectioning position setting region 611, a document information region 612 and a thumbnail display region 613 are displayed for each paper document, the document information region 612 showing a group of image pages corresponding to the paper document and the thumbnail display region 613 corresponding to the paper document. Displayed in the thumbnail display region 613 is a thumbnail image 614 for each of one or more page images (hereinafter referred to as a "group of page images") corresponding to the paper document. Displayed in the document information region 612 are, for example, a number indicating a paper document and a page count indicating the number of page images corresponding to the paper document. In the sectioning position setting screen 610 exemplified in FIG. 6B showing initially-divided five documents (documents 1 to 5), "document 1" includes five page images, and the thumbnail images 614 for the respective five page images are displayed in the thumbnail display region 613. In the sectioning position setting regions 611, pieces of the document information region 612, the thumbnail display region 613, and the scan-image thumbnail images 614 are displayed for the respective documents, arranged vertically.

The sectioning position setting region 611 shown in FIG. 6B represents a state where page images each determined by the similar business form determination processing in S508 as being similar to a business form learned as a sectioning position in the past are set as initial sectioning positions. For example, in each sectioning position setting region 611 shown in FIG. 6B, a page image set as an initial sectioning position is displayed as the first page in the thumbnail display region 613. Note that paper documents may be sectioned such that a page image set as an initial sectioning position is located as the first page image or the last page image of a group of page images corresponding to each paper document. In the sectioning position setting region 611 shown in FIG. 6B, the documents are separated such that a page image set as an initial sectioning position is located as the first page image of a group of page images corresponding to each paper document.

Although a method for adding and correcting a sectioning position will be described later with reference to FIGS. 7A and 7B, it is possible to combine initially-divided documents by deleting an initial sectioning position. For instance, in a case where a user right-clicks on the first page image in the initially-divided "document 2" to show a menu and gives an instruction on the menu to combine the "document 2" with the previous document, the initial sectioning position for the "document 2" is deleted, and the document 1 and the document 2 are combined and displayed as a single document. Once a correction such as adding or deleting a sectioning position is made and the OK button 615 is pressed to save the corrected sectioning position, the corrected sectioning position is saved, and the sectioning position setting screen 610 is closed. Then, the undivided document list screen 600 is displayed such that, among the undivided scan image data displayed in the list 601 of undivided documents, the document count 605 for the undivided scan image data corrected in its sectioning position has been updated. In a case where a CANCEL button 616 shown in FIG. 6B is pressed, the corrected sectioning position is not saved, the sectioning position setting screen 610 is closed, and the undivided document list screen 600 is displayed.

Figure 7A:
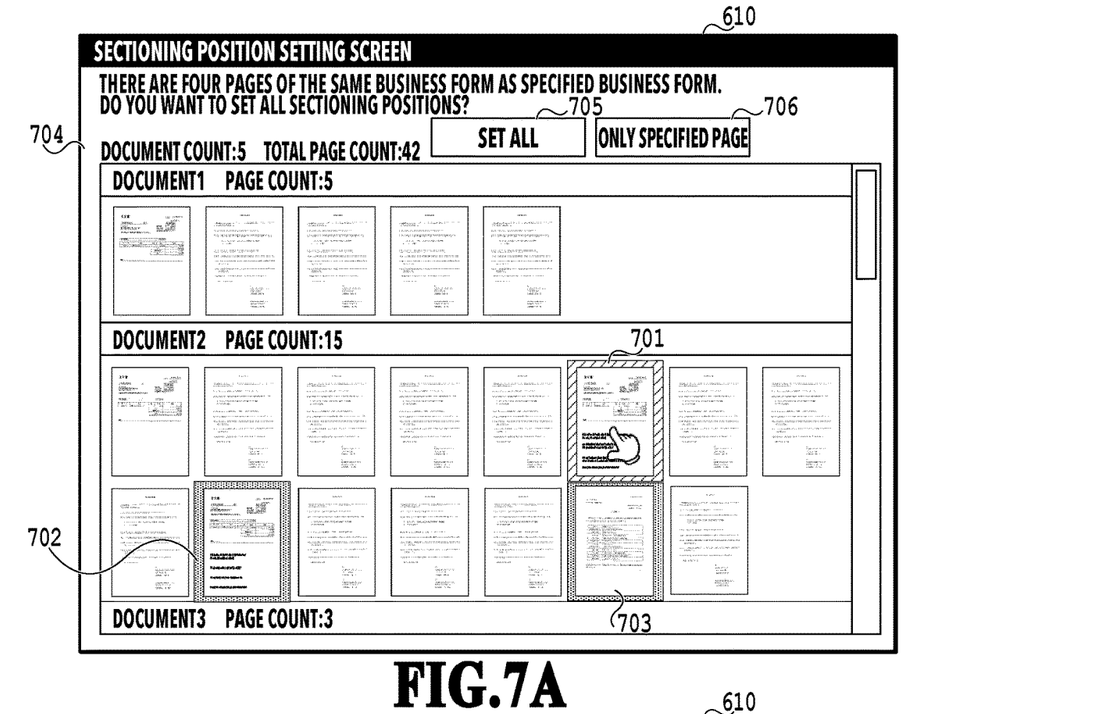
FIGS. 7A and 7B are diagrams illustrating an example of a method of correcting a sectioning position using a sectioning position setting screen displayed by the MFP or the client PC according to Embodiment 1.
Figure 7B:
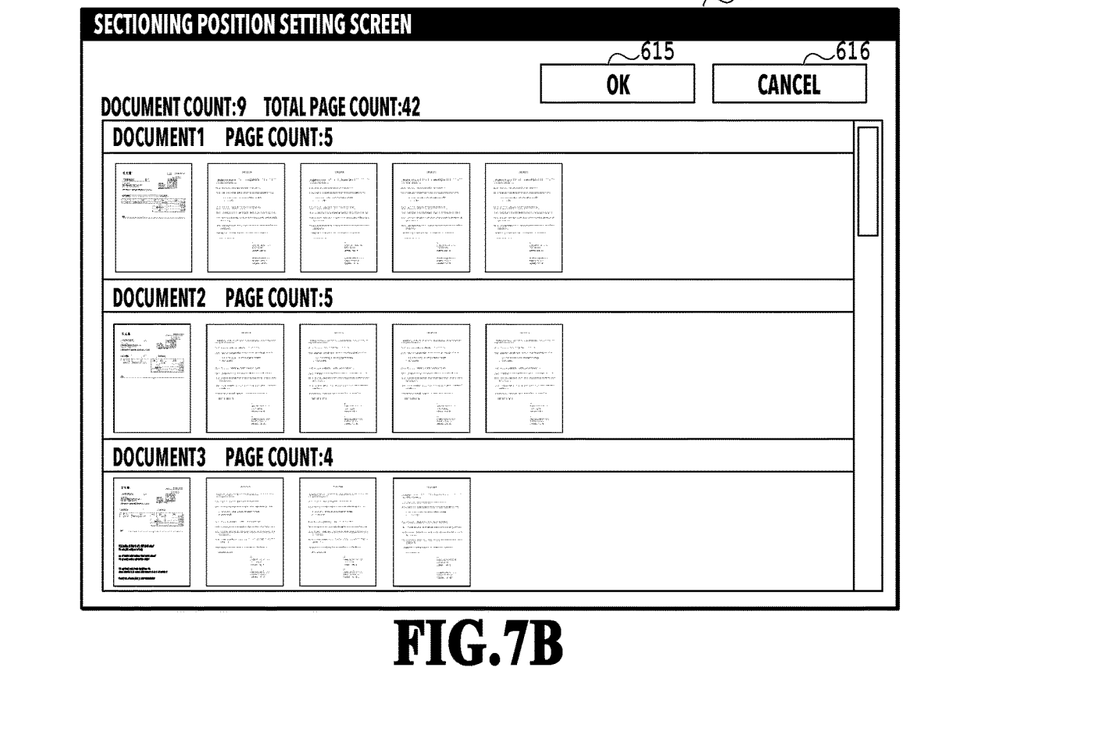

FIGS. 7A and 7B are diagrams illustrating an example of a method for adding and correcting a sectioning position using the sectioning position setting screen 610 displayed by the MFP 110 or the client PC 111 according to Embodiment 1. The sectioning position setting screen 610 shown in FIG. 7A is a state where a sectioning position is being added or corrected. On the sectioning position setting screen 610, a user instructs addition or correction by selecting a thumbnail image 701 for a page image that the user wants to specify as a new sectioning position. A user makes the selection by, for example, operating an operation input device such as a pointing device, placing the cursor on the position where the thumbnail image 701 is displayed, and clicking on a button on the operation input device. Hereinafter, a selected thumbnail image is referred to as a specified thumbnail image.

Once the specified thumbnail image 701 is selected (S514), the specified thumbnail image 701 is displayed in a display mode discriminable from other thumbnail images, such as highlight display (S517). In this event, the MFP 110 transmits information indicating a page image corresponding to the specified thumbnail image 701 (specified page information) to the MFP-collaboration server 120, thereby requesting the MFP-collaboration server 120 to execute similar business form determination processing (S515). After completion of the similar business form determination processing (S516), the MFP 110 receives and obtains information indicating one or more page images similar to the page image corresponding to the specified thumbnail image 701 (similar business form page information), the information being transmitted from the MFP-collaboration server 120. Further, the MFP 110 displays thumbnail images 702, 703 for the page images indicated by the similar business form page information (hereinafter referred to as "candidate thumbnail images") as sectioning position candidates in a display mode such as highlight display to make them discriminable from other thumbnail images (S517).

The candidate thumbnail images 702, 703 are preferably displayed in a manner discriminable from the specified thumbnail image 701 by using a display mode, such as highlight display, different from the highlight display mode used for the specified thumbnail image 701. Note that examples of a method of displaying a thumbnail image discriminably include changing the color, size, or the like of the thumbnail image and decorating the perimeter of the thumbnail image with a frame or the like. Note that in a case where not all of the candidate thumbnail images cannot be displayed in the display region, a navigation region may be provided on the right side of the sectioning position setting screen 610 to, for example, display a list of all the candidate thumbnail images so that they are all visible and easier to be checked.

In the event where the candidate thumbnail images are displayed discriminably, the MFP 110 displays, for example, a SELECT ALL button 705 and an ONLY SPECIFIED PAGE button 706 in the sectioning position setting screen 610, as exemplified in FIG. 7A. The SELECT ALL button 705 is for receiving a user operation for setting all the page images indicated by the similar business form page information as sectioning positions. The ONLY SPECIFIED PAGE button 706 is for receiving a user operation for setting only the specified page image as a sectioning position. In the event of displaying the SELECT ALL button 705 and the like, the MFP 110 may display a message 704 on, e.g., an upper part of the sectioning position setting screen 610 to check with a user whether to, for example, set all the page images indicated by the similar business form page information as sectioning positions.

The page images corresponding to the candidate thumbnail images 702, 703 are shown as being selected as candidate sectioning positions. The page images corresponding to the candidate thumbnail images 702, 703 being selected as candidate sectioning positions can be unselected by a user operation. As an example, a case is described where the candidate thumbnail image 703 is a thumbnail image for a page image erroneously determined as a similar business form, i.e., the candidate thumbnail image 703 is a thumbnail image for a page image unintended by a user as a sectioning position. In this case, for example, once a user specifies the candidate thumbnail image 703 by performing a user operation such as clicking on the candidate thumbnail image 703, the MFP 110 removes the page image corresponding to the candidate thumbnail image 703 from selected candidate sectioning positions. In this event, the MFP 110, e.g., changes the display mode of the candidate thumbnail image 703 to the display mode similar to that of the thumbnail images for the other page images to show that the candidate thumbnail image 703 is no longer a candidate sectioning position. Also, the MFP 110 may update the content of the message 704, such as updating the value of the number of pages of similar business forms in the message 704 displayed on the sectioning position setting screen 610.

In a case where the SELECT ALL button 705 is pressed by a user operation such as a click, all the page images corresponding to the respective candidate thumbnail images being selected as candidate sectioning positions are set as sectioning positions. FIG. 7B is a diagram showing an example of how the sectioning position setting screen 610 looks in a case where page images corresponding to the candidate thumbnail images being selected as candidate sectioning positions are set as sectioning positions. For example, in a case where the page images corresponding to the specified thumbnail image 701 and the candidate thumbnail image 702 are set as sectioning positions, five thumbnail images before the specified thumbnail image 701 are displayed in the thumbnail display region for the document 2 in FIG. 7B. Also, thumbnail images for the four page images having the specified thumbnail image 701 as the first page are displayed in the thumbnail display region for the document 3 in FIG. 7B. Also, in a case where the candidate thumbnail image 703 has been unselected in FIG. 7A, thumbnail images for six page images having the candidate thumbnail image 702 as the first page are displayed in the thumbnail display region for a new document 4 (not shown) in FIG. 7B.

Meanwhile, in a case where the ONLY SPECIFIED PAGE button 706 is pressed by a user operation such as a click, only the page image corresponding to the specified thumbnail image 701 is set as a sectioning position. In this case, neither of the page images corresponding to the candidate thumbnail images 702, 703 is set as a sectioning position. Thus, in the thumbnail display region for the document 3, ten thumbnail images having the specified thumbnail image 701 as the first page are displayed. Also, in a case where there is no similar page image similar to the page image corresponding to the specified thumbnail image 701, the MFP 110 displays, as the sectioning position setting screen 610 shown in FIG. 7A, the sectioning position setting screen 610 in which no candidate thumbnail image is displayed in a display mode such as highlight display. In this case, the MFP 110 may set a page image corresponding to the specified thumbnail image 701 as a sectioning position without displaying the SELECT ALL button 705, the ONLY SPECIFIED PAGE button 706, and the message 704 shown in FIG. 7A.

On the sectioning position setting screen 610 exemplified in FIG. 7A or 7B, a user may specify a plurality of thumbnail images by specifying a thumbnail image as a specified thumbnail image in addition to the already-specified specified thumbnail image 701. In this case, the processing from S514 to S517 shown in FIGS. 5A and 5B are repeated.

Once the OK button 615 shown in FIG. 6B or 7B or the SELECT ALL button 705 or the ONLY SPECIFIED PAGE button 706 shown in FIG. 7A is pressed, business form learning processing is executed using the page image corresponding to the specified thumbnail image (S519). As a result of this learning, the specified page image is registered as a learned business form. From then on, the learned business form will be used as a business form to be initially determined as a sectioning position in the analysis processing in S508. Note that in response to the OK button 615 or the like being pressed, the MFP 110 may display a screen to have a user select whether or not to perform learning using the page image corresponding to the specified thumbnail image. Also, in a case where the OK button 615 is pressed with a plurality of specified thumbnail images being specified, the MFP 110 may display a screen for having a user select a specified thumbnail image to be used for the learning.

As thus described, according to the present embodiment, candidate sectioning positions automatically identified based on a page image specified by a user can be checked before scan image data is divided. Also, in a case where automatically-identified candidate sectioning positions are not what is intended by a user, the user can delete some or all of the automatically identified candidate sectioning positions. As a result, the present embodiment can help prevent the scan image data from being divided at a position unintended by a user.

OTHER EMBODIMENTS

In the example described in the above embodiment, the screens in FIGS. 6A and 6B and FIGS. 7A and 7B are displayed in S513 and S517 on the operation unit of the MFP 110 or the client PC 111 based on results of the analysis processing in S508 or the similar business form determination processing in S516 in the MFP-collaboration server. Note, however, that the present disclosure is not limited to the above example where the analysis processing in S508 or S516 and the screen display processing in S513 or S517 are performed by different apparatuses. For example, a configuration is possible in which the processing in and after S508 is performed by a single information processing apparatus such as a client PC.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can help prevent scan image data from being divided at a position unintended by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-162743, filed Oct. 1, 2021 which is hereby incorporated by reference wherein in its entirety.

What is claimed is:

1. An apparatus comprising:
one or more hardware processors; and
one or more memories storing one or more programs configured to be executed by the one or more hardware processors, the one or more programs including instructions for:
    displaying, on a screen, a list of a plurality of page images obtained by reading a plurality of documents in bulk;
    displaying, on the screen where the list of the plurality of page images is displayed, one or more page images similar to a page image specified by a user as one or more sectioning position candidates in a manner discriminable from other page images of the plurality of page images; and
    correcting the one or more sectioning position candidates based on a correction instruction from the user.

2. The apparatus according to claim 1, wherein the one or more programs further include an instruction for
    in a case where the one or more sectioning position candidates are corrected, dividing the plurality of page images based on the specified page image and the corrected one or more sectioning position candidates and
    in a case where the one or more sectioning position candidates are not corrected, dividing the plurality of page images based on the specified page image and the one or more sectioning position candidates being displayed.

3. The apparatus according to claim 1, wherein the one or more programs further include an instruction for
    in a case where the one or more sectioning position candidates are corrected, requesting a server to divide the plurality of page images based on the specified page image and the corrected one or more sectioning position candidates and
    in a case where the one or more sectioning position candidates are not corrected, requesting the server to divide the plurality of page images based on the specified page image and the one or more sectioning position candidates being displayed.

4. The apparatus according to claim 3, wherein one or more similar page images similar to the specified page image are identified by the server from the plurality of page images and are displayed on the screen as the one or more sectioning position candidates.

5. The apparatus according to claim 1, wherein a page image specified based on a correction instruction from the user is removed from the one or more sectioning position candidates discriminably displayed.

6. The apparatus according to claim 1, wherein the one or more programs further include an instruction for identifying one or more similar page images similar to the specified page image from the plurality of page images, and
the identified one or more similar page images are displayed on the screen as the one or more sectioning position candidates.

7. The apparatus according to claim 6, wherein the one or more programs further include an instruction for obtaining a text region in each of the plurality of page images, and
based on a location of the text region in the specified page image, the one or more similar page images similar in the location of the text region are identified.

8. The apparatus according to claim 1, wherein the one or more programs further include an instruction for, based on a predetermined condition, obtaining an initial sectioning position from the plurality of page images, and
in the displaying, on a screen, a list of a plurality of page images, a page image corresponding to the initial sectioning position is displayed on the screen in a manner discriminable from other page images of the plurality of page images.

9. The apparatus according to claim 8, wherein the condition is data on a pre-registered image, and
a page image similar to the pre-registered image is obtained as the page image corresponding to the initial sectioning position.

10. The apparatus according to claim 9, wherein based on a location of a text region in the pre-registered image, a page image similar in the location of the text region is obtained as the page image corresponding to the initial sectioning position.

11. The apparatus according to claim 8, wherein
the condition is pre-registered information indicating a position of a text region in an image, and
a page image having a text region at a position similar to the position of the text region in the image is obtained as the page image corresponding to the initial sectioning position.

12. The apparatus according to claim 8, wherein
the one or more programs further include an instruction for registering data on the specified page image as the condition.

13. The apparatus according to claim 8, wherein
the one or more programs further include an instruction for registering information indicating a position of a text region in the specified page image as the condition.

14. An information processing method comprising the steps of:
displaying, on a screen, a list of a plurality of page images obtained by reading a plurality of documents in bulk;
displaying, on the screen where the list of the plurality of page images is displayed, one or more page images similar to a page image specified by a user as one or more sectioning position candidates in a manner discriminable from other page images of the plurality of page images; and
correcting the one or more sectioning position candidates based on a correction instruction from the user.

15. A non-transitory computer readable storage medium storing a program for causing a computer to perform a control method of an apparatus, the control method comprising the steps of:
displaying, on a screen, a list of a plurality of page images obtained by reading a plurality of documents in bulk;
displaying, on the screen where the list of the plurality of page images is displayed, one or more page images similar to a page image specified by a user as one or more sectioning position candidates in a manner discriminable from other page images of the plurality of page images; and
correcting the one or more sectioning position candidates based on a correction instruction from the user.

* * * * *